Aug. 5, 1958  H. C. STANLEY  2,846,542
RELAY STRUCTURE
Filed Nov. 13, 1956  2 Sheets-Sheet 1
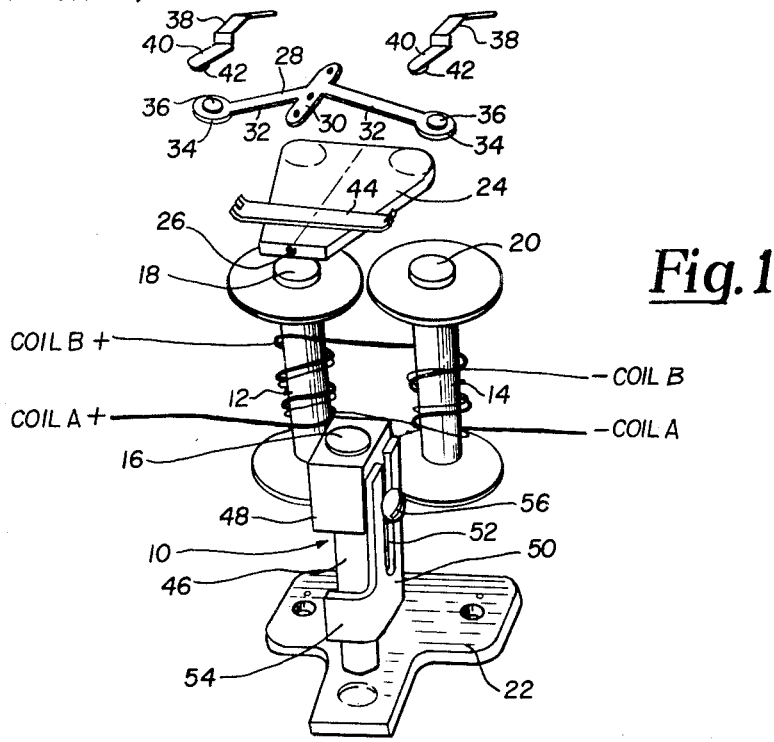
Fig. 1
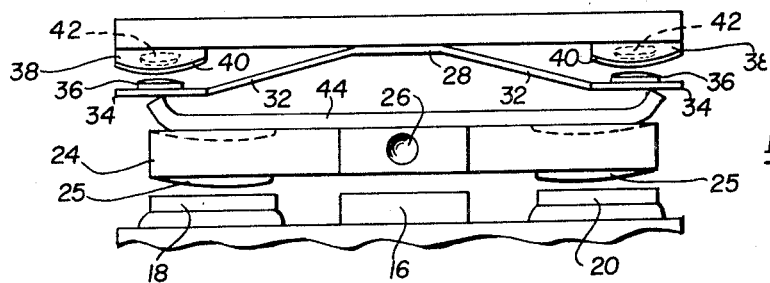
Fig. 2-A
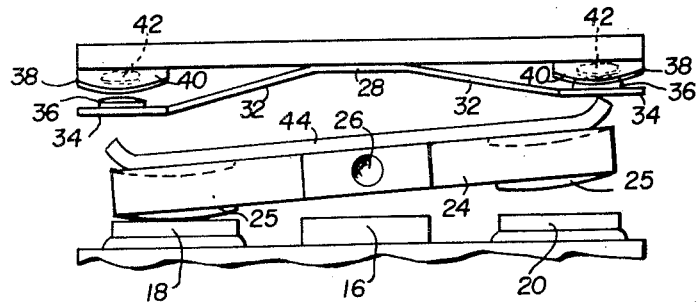
Fig. 2-B
INVENTOR.
HOWARD C. STANLEY

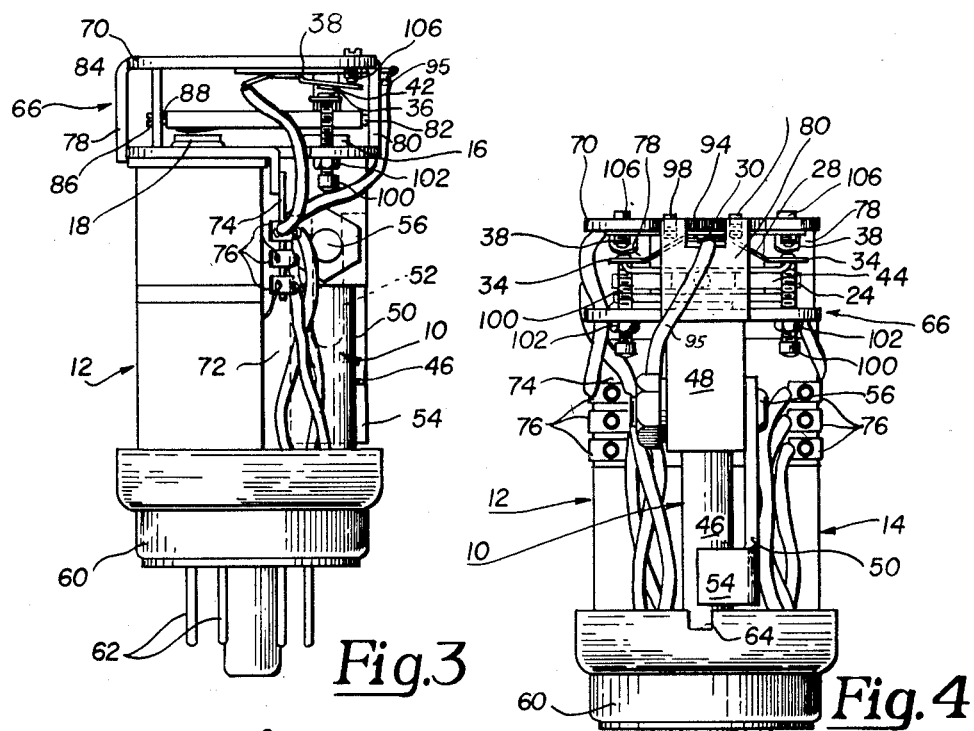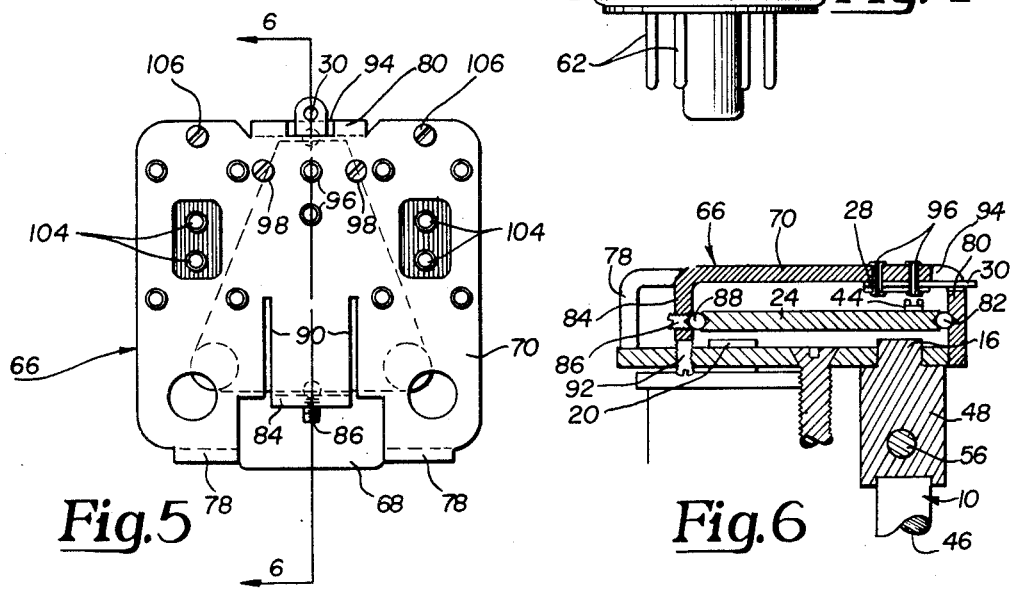

United States Patent Office 2,846,542
Patented Aug. 5, 1958

2,846,542

RELAY STRUCTURE

Howard C. Stanley, Glendora, Calif., assignor to North Electric Company, Galion, Ohio, a corporation of Ohio Application November 13, 1956, Serial No. 621,876

2 Claims. (Cl. 200—93)

The present invention relates to relays, and particularly, to an improved polarized relay.

In general concept, a polarized relay embodies first means producing a substantially constant magnetic flux and second means producing a variable magnetic flux, the said first means providing the main motivating force for the relay armature and the second means providing a control function. This relationship facilitates relay actuation upon occurrence of relatively small variations in the control function and with relatively small relay components.

The object of the invention is to provide a polarized relay of improved mechanical construction affording the advantages of small size, compactness, facility for hermetic sealing, mechanical functioning over a wide temperature range and a super-sensitive operating range, ability to withstand extreme degrees of vibration and acceleration without mechanical damage and without affecting operating characteristics, long life, and ability to withstand high potentials.

A principal object of the invention is to provide an improved polarized relay structure embodying a compact magnetic assembly comprising a plurality of flux producing means defining three poles disposed in triangular relation, and an armature overlying said poles, said armature being pivotally mounted adjacent said poles on an axis substantially paralleling a line extending from one pole intermediate the other two poles.

More specifically, the invention provides an improved polarized relay structure comprising three spaced parallel legs disposed in the form generally of an isosceles triangle, the leg at the apex of the triangle comprising a permanent magnet and the other two legs comprising coil cores, the coils wound on the cores carrying current to afford a control function upon variation of current flow therethrough. In its preferred embodiment, the assembly also includes an armature of generally triangular form pivotally mounted in conformity with the triangular disposition of the said three legs on an axis intersecting the longitudinal axis of the permanent magnet and extending midway between the longitudinal axes of the two coil cores and essentially perpendicular to the plane determined thereby.

Concerning ability to withstand acceleration forces, such as are encountered in free flight equipment including guided missiles, rockets and the like, it is an object of the invention to provide an improved relay structure of the mechanical characteristics above described wherein the pivot axis of the armature is located along or parallel to one of the coordinate axes of the relay and the armature is balanced to opposite sides of its pivotal axis so that the same is not responsive to or actuatable by acceleration forces along any of the coordinate axes of the relay. In the specific embodiment above referred to, the armature is preferably in the general form of an isosceles triangle mounted for pivotal movement about a central axis median to its sides of equal length, whereby the armature is balanced and non-responsive to acceleration forces.

Another object of the invention is to provide an improved contact assembly for relays comprising a conductive element including a pair of contact carrying spring arms extending transversely of the axis of the armature and operatively engaging opposite sides of the armature to be actuated thereby, the contact carrying spring arms simultaneously serving normally to bias the armature to a predetermined position, thus to eliminate the need for special armature biasing springs.

An additional object of the invention is to provide an improved relay structure of the character above described including a compact assembly of contacts to be actuated by the armature, the assembly comprising an elongated contact carrying spring defining the arms above referred to and further including means for effecting adjustment of the spring force of said arms and the position of the stationary contact means cooperable with said arms. In the preferred embodiment, the said arms engage the armature at points spaced equally from the pivot axis thereof so as to maintain the balanced condition of the armature and normally to bias the armature to a balanced position intermediate its two end positions.

A further object of the invention is the provision in the improved relay above described of adjustable shunt means for the permanent magnet, facilitating ready and accurate calibration of the relay, not only upon initial assembly but after periods of use.

Other objects and advantages of the invention will become apparent hereinafter.

In order to acquaint those skilled in the art with the manner of making and using my improved polarized relay, I shall describe, in connection with the accompanying drawings, a preferred embodiment of the relay and a preferred mode of constructing the same.

In the drawings:

Figure 1 is a somewhat schematic exploded perspective view of the basic components of the relay disclosing the essential characteristics of the relay;

Figure 2A is a diagrammatic fragmentary front elevation of the armature, pole and contact assembly of the relay showing the armature in normal balanced position;

Figure 2B is a view similar to Figure 2A showing the armature in one operated position;

Figure 3 is a side elevation of a complete relay embodying the invention;

Figure 4 is a front elevation of the relay;

Figure 5 is a plan view of the relay; and

Figure 6 is a fragmentary vertical cross section of the relay taken substantially on line 6—6 of Figure 5.

Referring now to the drawings, Figure 1 discloses the predominant characteristics of the improved relay structure of the invention. A principal feature of the relay is the disposition of the components thereof in a generally triangular relation. A second feature is the manner of mounting the relay armature in balanced condition so that the same is not responsive to acceleration forces exerted on the relay. A third feature of the relay is the adjustable shunt for calibrating the magnetic means of the relay, and a fourth feature is the provision of unitary spring means serving the dual functions of carrying the movable contacts of the relay and normally biasing the relay armature to a predetermined position. These and other features will become more clearly apparent in the following detailed description.

As shown in Figure 1, the relay is comprised essentially of a plurality of flux producing means, herein indicated at 10, 12 and 14, which define three poles 16, 18 and 20, respectively. In the preferred embodiment of the invention, the means 10 comprises a permanent magnet and the means 12 and 14 comprise electromagnetic assemblies. Each assembly includes a pair of windings, one of coil A and one of coil B, wound on a common core. In other words, coil A is distributed over two permeable cores and coil B is distributed over the same two cores, so that upon energization of either one or both of the coils, magnetic flux is produced by both electromagnetic assemblies in the cores thereof. While each coil, or even each winding, could be referred to generally as a flux producing means, the latter term as employed herein is intended principally to define a permanent magnet and/or an electromagnetic assembly including a core and at least one winding. More specifically, where reference is made herein to "three flux producing means," or to "flux producing means" followed by one of the numerals 10, 12 and 14, the foregoing definition is primarily intended. On the other hand, where reference is made to "a plurality of flux producing means defining three poles," the poles are those indicated at 16, 18, and 20, and the same may be defined by such form or combination of magnets or electromagnetic means, including at least one electromagnetic assembly, as may be desired.

The poles 16, 18 and 20 are disposed in triangular relation as the relay is viewed in plan and are located in a substantially common plane at one end of the permanent magnet and the cores of the electromagnetic assemblies. The magnet and the cores are disposed in spaced, parallel, generally coextensive relation to one another in said triangular relationship, thereby to define a three-legged triquetrous skeletal structure, i. e., the skeleton of a regular triangular prism. Adjacent one end thereof, the said three legs are magnetically connected by a stationary permeable plate 22. Adjacent the opposite ends thereof, they are adapted to be magnetically connected by a movable permeable armature 24. The armature 24 preferably conforms in shape to the triangular disposition of the poles 16, 18 and 20 and is mounted adjacent the poles in overlying relation thereto and in conformity therewith, so that the three vertices of the generally triangular armature are disposed adjacent the respective ones of the poles of the flux producing means.

The armature is mounted for movement about a pivot axis, indicated at 26 in Figure 1, which intersects the longitudinal axis of one pole 16 and extends midway between the longitudinal axes of the other two poles 18 and 20 essentially perpendicular to the plane determined thereby. The flux producing means 10 defining the pole 16 is designed to produce a substantially constant motivating force for the armature, and the other two means 12 and 14 are designed to produce a variable control flux, the assembly thus defining magnetic circuits between the means 10 and 12 and between the means 10 and 14, whereby the armature is responsive to the flux in either one or both of the magnetic circuits to be pivoted toward either the pole 18 or the pole 20, and in certain types of relays to be balanced intermediate its end positions. The armature in accordance with the full scope of the invention is balanced to opposite sides of its pivot axis to facilitate attainment of said balanced position and to render the armature non-responsive to acceleration forces exerted on the relay. In the preferred structure, the poles 16, 18 and 20 define an isosceles triangle having the pole 16 at its apex, and the armature 24 is of a corresponding generally triangular form. The pivot axis 26 of the armature is essentially the same length as and extends substantially parallel to a line segment from the apex to the midpoint of the base of the triangle defined by the poles, so that said axis is median to the sides of the armature that are of equal length. To facilitate pivotal mounting of the armature, the apex portion thereof is preferably truncated, so that the armature is actually in the form of a trapezoid. However, for purposes of consistency herein, the armature will be referred to as being of generally triangular form.

Due to the triangular disposition of the described components, the relay structure may be made very compact and of relatively small size to meet even the most rigid space requirements, such as are encountered in flight equipment. The balancing of the armature enhances its operation and renders the same non-responsive to high rates of acceleration, whereby the relay structure is further adapted for use in flight equipment.

Further to conserve space, to reduce the number of components and to enhance the balanced condition of the armature, the relay structure of the invention includes a novel contact assembly located in the corner portions of the relay resulting from the triangular shape of the armature and the triangular disposition of the three flux producing means, the assembly including a unitary conductive member extending transversely of the pivot axis of the armature and having a pair of arms serving the dual functions of constituting the movable contact arms of the relay and the armature biasing springs. Such means is shown in Figure 1 as comprising a unitary leaf spring 28 formed of a suitable conductive sheet material having inherent resiliency. The spring includes a connector tab 30 adjacent its midpoint and is adapted to be mounted at said point on a support in spaced opposed relation to the apex portion of the armature and in alignment with the pivot axis thereof. To opposite sides of its midpoint, the spring includes a pair of arms 32 of equal length which extend diagonally toward and to opposite sides of the armature. The arms operatively engage the armature at equal distances from the pivot axis thereof to facilitate retention of the balanced condition of the armature and at the same time to exert a biasing force on the armature normally to maintain the same in its balanced intermediate position and to urge the armature toward this intermediate position from either one of its end positions. If desired, the spring arms may in certain cases be employed to bias the armature to either one of its end positions when said intermediate position is not required. Outwardly of but adjacent the side edges of the armature, the arms 32 include enlarged end portions 34 each carrying a contact 36 which, as previously indicated, are located generally in the corner spaces defined as a consequence of the triangular shape of the armature. A pair of stationary contact leafs 38 are supported adjacent one end thereof in spaced relation, respectively, to the movable contacts 36, each leaf including a free flexible outer end portion disposed in spaced opposed aligned relation to the end portion 34 of the respective arm 32 and carrying a contact 42 adapted to be engaged by the respective contact 36. The entire assembly is compact and readily adjustable, and the leaf spring 28 serves the multiple functions previously referred to.

The operative connection between the arms 32 of the spring and the armature is preferably accomplished by means of a bar 44 secured to the armature transversely of the pivot axis thereof and extending equal distances to opposite sides of said axis, the ends of said bar extending beyond the edges of the armature and being turned up for optimum engagement with the end portions 34 of the spring.

A further distinctive feature of the present invention is the provision of means for effecting ready and accurate calibration or adjustment of the relay. This means is comprised of certain adjusting means to be described and of means for regulating the main actuating force or flux of the relay armature. In a polarized relay, the armature actuating flux is usually produced mainly by a permanent magnet, and that is the case in the preferred embodiment of this invention, the previously described flux producing means 10 comprising a rod-like permanent magnet 46 carrying a permeable pole piece 48 which defines the pole 16. To facilitate regulation of the magnet, a magnetic shunt 50 formed of a permeable metal is mounted for adjustment relative to the magnet to provide a flux path by-passing portions of the magnet, thus to vary the magnetic flux produced at the pole 16. In the preferred embodiment, the shunt 50 comprises a permeable plate having a slot 52 in one end portion thereof and a pair of upstanding parallel tabs 54 at its opposite end. The two tabs are spaced apart by a distance slightly less than the diameter of the magnet 46 so as to firmly grasp the magnet, and the slot is preferably of a length to accommodate disposition of the tabs at any point along the length of the magnet. The slotted end portion of the shunt may be adjustably connected to permeable parts of the magnetic circuit at either end of the magnet, and in the embodiment disclosed is slidably mounted for adjustment relative to the pole piece 48 by means of a bolt 56 extending through the slot 52 and into the pole piece. The bolt preferably is provided with a nut and lock washer to lock the shunt in adjusted position. Upon loosening the bolt, the shunt may be adjusted to bypass substantially all or substantially any portion of the magnet, thereby to effect variation in the flux produced at the pole 16. This convenient means, without increasing the size of the relay, facilitates accurate calibration of the relay, enables a more stabilized permanent magnet by allowing the magnet to be highly magnetized before placement of the shunt, and protects the permanent magnet against depolarization by the electromagnetic coils. The adjustable shunt further eliminates inaccurate, time consuming calibration based upon magnetizing or demagnetizing the permanent magnet after assembly of the relay. While the relay of the invention is preferably hermetically sealed after assembly and calibration, should it become necessary to recalibrate the relay, the same may readily be unsealed and recalibrated by simple adjustment of the magnetic shunt 50 and the other adjustable means of the relay. In unsealed relays, the shunt facilitates adjustment or calibration at any time.

In conjunction with the permanent magnet, the control flux producing means 12 and 13 preferably each comprise electromagnetic coil means including a permeable core, the cores defining the poles 18 and 20, respectively. The two cores are preferably rod-like, similar to the permanent magnet 46, and are coextensive with and disposed in spaced parallel relation to one another and the magnet in the form generally of an isosceles triangle. At the lower end thereof, each of the rod-like elements 18, 20 and 46 extends into the plate 22, whereby the elements are physically and magnetically connected by the plate. By way of example, the permanent magnet may be disposed with its north pole at the upper end thereof, whereby the two permeable cores, in the absence of current flow through the coil means, define poles of south polarity at the upper ends thereof for magnetic cooperation with the permanent magnet. Of course, north and south poles can be interchanged. While the connector plate 22 could suitably be triangular in shape, similar to the armature 24, the same is preferably of T-shape as shown to facilitate mounting of the relay in an enclosure can.

The coils wound on the cores 18 and 20 in the preferred embodiment of the invention are two in number and are each distributed on both of the cores, coil A being wound and connected to a first power source to carry current in one direction along core 18 and in the opposite direction along core 20 and coil B being wound and connected to a second power source to carry current in said opposite direction along core 18 and said one direction along core 20, whereby the coils produce poles of opposite polarity at each pole piece. In the specific embodiment disclosed herein, the relay is intended to be in a non-operated, center-off, or balanced condition intermediate or midway between its end positions at the condition of normal current flow. For this purpose, the number of turns of each coil on the two cores are equal, i. e., coil A has the same number of turns on core 18 as on core 20. For other purposes, this relationship could be varied as is known in the art. Also, at the condition of normal current flow in each of the two windings, the flux producing characteristics of the two coils preferably offset one another, so that electromagnetic or control flux influence is not exerted on the armature and the armature will be balanced by the spring arms 32, the permanent magnet flux distributing itself equally, in the ideal structure, through the cores of the two electromagnetic assemblies. In other words, in the preferred embodiment of the relay of the invention, the ampere turns of the coils on the cores are all equal at given values of current for the center-off or balanced position of the armature. Again, this relationship could be modified in accordance with the knowledge of the art.

With the two coil relationships shown in Figure 1, one of the coils is adapted to carry a bias or reference current, and the other coil is adapted to carry a control current, the relay being actuated upon a predetermined increase or decrease in the control current from normal. For example, if coil B carries the reference current and coil A the control current, and the connections and windings of the coils are as indicated in Figure 1, a predetermined increase in the control current in coil A will produce a dominating north polarity at pole 18 and a dominating south polarity at pole 20, whereupon the armature will move toward the pole 20 to close the left hand contact pair 36—42. On the other hand, if control current is decreased from normal to a predetermined extent, the control current will produce a resultant magnetic field in which the reference coil B will produce a dominating south polarity at pole 18 and a dominating north polarity at pole 20 to move the armature toward the pole 18 to close the right hand contact pair 36—42. In either case, the pole having north polarity will exert a repelling force on the armature and the pole having south polarity will exert an attracting force on the armature.

In the event that the relay control function is dependent solely upon reversal of the direction of current flow, and no balanced intermediate open circuit position is required, a single one of the coils may be employed to control armature actuation.

The positions and movement of the relay armature are clearly represented in Figures 2A and 2B showing, respectively, the normal balanced open circuit position of the armature and one operated position of the armature. As shown in Figure 2A, the armature 24 is normally balanced midway between its end positions and is biased to and retained in such position by the spring arms 32. In this position, the permanent magnet flux should ideally be distributed equally between the poles 18 and 20, in which case the force exerted by the two-spring arms 32 on the armature should be equal. In the normal position of the armature, each pair of contacts 36—42 is separated, and the circuits within which the contacts are connected are open. To move the armature out of its balanced condition, an effective resultant magnetic flux in the magnetic circuits (10—12, 10—14, 12—14) in excess of the force of one spring arm 32 is required. In view of this fact, relay calibration is readily accomplished, at least in part, by adjustment of the flux producing effect of the permanent magnet 46 and the tension of the arms 32. When the magnetic forces exceed the spring force, for example upon such decrease in control current in coil A as will produce the requisite south polarity at pole 18 and a corresponding assistive north polarity at pole 20, the armature pivots about its central axis 26 toward the pole 18, thus to close the right hand contact pair 36—42 as is shown in Figure 2B. To afford optimum completion of the magnetic circuit at the south pole, the armature preferably engages the respective pole, in this case pole 18, over an appreciable surface area. To this end, the armature 24 is provided with a pair of pole projections 25 aligned respectively with the poles 18 and 20. The pole projections are preferably pressed out of the body of the armature (as indicated by dotted lines) at an angle to the plane thereof, so that each projection may engage substantially flat against the respective pole. To obviate retention of the armature by the pole upon reestablishment of normal current flow in coil A, a non-magnetic shim, in the form preferably of a chrome plating on either the armature or the poles, is provided between the armature and the face of each pole. The total excursion of the armature is very short, thus insuring a compact relay structure and enhancing the ability of the relay to withstand extreme rates of vibration and acceleration without mechanical damage and without affecting operating characteristics.

Referring now to Figures 3 to 6, the complete structural form of our improved relay is shown as embodying all of the preferred structural relationships and features hereinbefore described, the relay being mounted on a connector base 60 including the customary pin connectors 62. In the complete assembly, the described relationship and form of connector plate 22, the magnet 46, the shunt 50, the cores of the electromagnetic assemblies, the armature 24, and the contact arms 32 is retained. The cores have reduced lower ends fitted into the bores provided in the plate 22, and the magnet 46 is intimately received within a depression in the plate. The plate in turn is fitted snugly in the base 60, portions of the side wall of the base being bent over, as indicated at 64, to retain the plate 22 therein. The coils employed in conjunction with the cores 18 and 20 are of conventional spool form.

A stationary non-permeable frame is mounted at the upper ends of the cores of the electromagnetic assemblies and the pole piece 48 of the magnet to support the armature and the contact assembly of the relay. The frame includes a pair of spaced parallel frame plates 68 and 70 which extend transversely of the axes of the cores and the magnet. The two plates are generally square as viewed in plan, the horizontal dimensions thereof corresponding substantially to the horizontal dimensions of the base 60. The inner one 68 of the two frame plates is provided with three holes therethrough receiving pole extensions provided on the cores of the electromagnetic assemblies and the pole piece of the magnet. An elongated, substantially centrally located, non-permeable screw 72 is extended downwardly through the frame plate 68 and threaded into the connector plate 22 to retain the assembly of the coils, the magnet, the pole piece and the plates 22 and 68. Immediately forwardly of the coils, portions of the lower frame plate 68 are bent downwardly to define a supporting surface to which is secured a terminal board 74 of insulation material, the board extending parallel to the plane of the coil axes intermediate the coils and the permanent magnet. The terminal board carries a plurality of terminal connectors 76, preferably three adjacent each side edge thereof, for interconnection of leads from the pins 62, the two coils and the supporting springs 38 for the stationary contacts.

The upper or outer frame plate 70 is provided adjacent its rearward edge with a pair of downwardly extending side legs 78 and adjacent the forward edge thereof with a central leg 80, the legs 78 and 80 being brazed or soldered to the inner frame plate 68 to dispose the two plates in spaced parallel relation. The central front leg 80 is disposed adjacent the permanent magnet and thus adjacent the apex portion of the armature 24. The armature and the leg in the juxtaposed surfaces thereof, i. e., the inner side of the leg 80 and the apex edge of the armature 24, are provided with corresponding conical depressions located on the pivot axis of the armature, the said depressions receiving therein a small diameter ball bearing 82 which pivotally mounts one end of the armature on said leg. Adjacent the opposite end of the armature, the plate 70 includes a further depending leg 84 which is opposed to and aligned with the leg 80 and extends generally parallel to the rearward or base edge of the armature. The base edge of the armature is provided with a conical depression aligned axially with the ball 82, and the leg 84 is provided with a tapped bore aligned with said depression. A micrometer thread screw 86 is threaded in said bore and is provided at its lead end with a corresponding conical depression, the depression in the screw and the depression in the base edge of the armature receiving a ball bearing 88 which pivotally mounts the armature at the base edge thereof. The ball bearings 82 and 88 thus mount the armature for substantially friction free pivotal movement about the axis defined by the balls. To opposite sides of the leg 84, the outer frame plate 70 is slit, as indicated at 90, to impart resiliency to the leg. A micrometer thread screw 92 is threaded through a tapped bore in the inner frame plate 68 in alignment with the lower edge of leg 84 to accommodate adjustment of the position of the leg. By manipulation of the screw 92, the vertical position of the ball 88 and base edge of the armature may be adjusted relative to the poles 18 and 20 to effect adjustment of or variation in the air gap between the electromagnet poles and the armature. Mounting of the armature is thus facilitated and the screws 86 and 92 accommodate adjustment of bearing pressure and armature position.

At the juncture of the front leg 80 and the outer frame plate 70, the frame is notched to define an opening 94 through which the terminal 30 of the contact carrying spring 28 extends, the spring being mounted centrally on the lower surface of the plate 70 by means of rivets 96. The spring 28 overlies the armature in the manner previously explained, and the tab or terminal 30 thereof is electrically connected to one of the pins 62 by means of an insulated lead 95. To opposite sides of the mounting for the spring, the frame plate 70 is provided with tapped bores receiving micrometer thread adjusting screws 98, which engage, respectively, against the arms 32 of the spring to accommodate calibration of the spring pressure the arms exert on the armature. To define a positive lowermost limit of movement of the arms 32, the lower frame plate 68 carries a pair of stop screws 100 threaded through the plate in alignment with the end portions 34 of the spring and normally disposed to be engaged by the portions 34 in the balanced position of the armature. The ends of the actuator bar 44 on the armature are preferably notched or bifurcated to accommodate the stop screws 100, and the screws preferably carry nuts 102 for locking the screws in adjusted position.

As shown herein, the movable contacts 36 of the relay are grounded to the frame by virtue of direct connection of the spring element 28 to the top plate 70 of the frame. However, in some instances, it may be desirable to insulate the movable contacts from the frame to facilitate a generally universal use of the relay in satisfaction of a variety of circuit requirements. To this end, the contacts 36 may be mounted in insulated relationship by insulating the spring 28, fasteners 96 and screws 98 from the frame, and by providing insulated tips on the ends of the armature cross bar 44 and the screws 98 and 100.

Each stationary contact leaf 38 is mounted on the lower surface of the upper frame plate 70 to dispose the contact 42 carried thereby in vertical alignment with the respective movable contact 36, the stationary contact leaves being insulated from the plate 70 and being mounted thereon by rivets 104. Adjacent the forward edge thereof, the plate 70 is provided with a pair of tapped bores receiving adjusting screws 106 each of which has an insulated tip, or a tip of insulating material engaging, respectively, against the outer ends of the contact leaves 38 to effect adjustment of the position of the stationary contacts relative to the movable contacts. Due to the fact that each screw has a fine or slow thread and engages the leaf 38 adjacent the outer end thereof, whereas the contact 42 is carried inwardly of the end, exceedingly accurate adjustment of the stationary contacts is accommodated.

To adjust the movable contacts 36, the screws 98 are threaded down to move the arms 32 into engagement with the armature and to apply a predetermined spring force thereto, the forces exerted by the two arms being substantially equal to bias the armature to its balanced center-off position. The screws 100 are then threaded upwardly until the tips thereof just engage the lower sides of the end portions 34 of the spring arms 32 in the balanced position of the armature and are locked in that position by the nuts 102. Downward movement of each spring arm 32 is thereby limited to that necessary to return the armature to balanced position, and the armature when actuated is moved against the full adjusted spring force of one of the arms 32. The stationary contact leaves 38 are thereafter adjusted by means of the screws 106 to space the contacts 42 from the contacts 36, in the normal balanced position of the armature and the movable contacts, by a distance slightly less than the excursion of the armature from its center-off position to one of its operated positions. The excursion of the armature is of course determined by the air gap adjustment effected by means of the screw 92.

In view of the foregoing description, it is apparent that the adjusting screws 86, 92, 98, 100 and 106, and the adjustable shunt 50 constitute means facilitating convenient, accurate adjustment and calibration of the relay as to each of its functions and operations. The armature is conveniently balanced and accurately mounted, and is substantially non-responsive to acceleration forces and the like. Armature excursion is short, so that the relay may be operated at high speed and is capable of withstanding extreme degrees of vibration. The relay structure is exceedingly compact and is adapted to be enclosed in a can to be hermetically sealed therein, the can (not shown) being slipped over the frame 66 and the upper marginal portion of the base 60 and secured in sealed relation to the base. Important features of the base and can are formation of the same in such manner and from such material that the relay may conveniently be hermetically sealed therein and that they then comprise a magnetic shield for the relay to prevent influence on the relay from extraneous magnetic fields. For this purpose, the can is preferably formed of mild steel.

In the physical embodiment disclosed herein, the relay, including its enclosure can and pin connector base, has an overall size of approximately 1½ x 1½ x 3 inches. The coils are designed and wound to carry current in the ratio of 20 to 1, the control coil A being adapted to carry a current of 15 to 230 milliamperes and the reference coil B being adapted to carry one-twentieth of the normal current in coil A, the relay operating upon a variation in control coil A of 15 milliamperes from normal current flow. The relay withstands acceleration forces of 30 gravity units with a duration of 11 (plus or minus one) milliseconds, and vibration of from 10 to 55 cycles per second with .060 inch total excursion. The temperature storage range of the relay is from minus 65° C. to plus 85° C. The contacts are designed for one million operations with 0.2 ampere resistive load, and the high potential rating of the relay is 1500 volts A. C. both coils to ground, and 500 volts A. C. all pins to ground.

Thus, all of the objects and advantages of the invention have been shown herein to be obtained in a highly economical and practical manner.

While I have described and shown what I regard to be a preferred embodiment of my invention, it is to be appreciated that various changes, rearrangements and modifications may be made therein without departing from the scope of the invention, as defined by the appended claims.

I claim:

1. In a relay structure, flux-producing means defining three parallel poles disposed in triangular relation, a generally triangular armature conforming to the triangular disposition of said poles pivotally mounted adjacent said poles on an axis intersecting its apex and the midpoint of its base, said pivot axis also intersecting the longitudinal axis of one pole and extending midway between the longitudinal axes of the other two poles, a contact spring spaced at its center from said armature and including a pair of contact carrying arms extending transversely of said pivot axis to opposite sides thereof, said arms being disposed adjacent the apex of said armature and extending beyond the sides thereof, said arms normally engaging said armature at points spaced equally from the pivot axis thereof and normally biasing said armature to a predetermined position, and adjusting means for said arms located adjacent the sides of said armature adjacent its apex.

2. A relay structure comprising a rod-like permanent magnet, a pair of electromagnetic assemblies each having a permeable rod-like core, said magnet and said cores being substantially coextensive with one another and disposed with their axes in spaced parallel generally triangular relation, a permeable plate physically and magnetically connecting said magnet and said cores adjacent one end thereof, a non-permeable frame disposed adjacent the opposite ends of said magnet and said cores transversely thereof, said frame including a pair of spaced parallel plates the inner one of which connects said opposite ends of said magnet and said cores, said magnet and said cores including pole pieces extending through said inner frame plate, a non-permeable fastener extending between said inner frame plate and said permeable plate and retaining said plates, said cores and said magnet in assembled relation, said frame including portions extending transversely between the plates thereof which portions are aligned generally with one another along a pivot axis intersecting the axis of said permanent magnet and extending midway between the axes of said cores substantially perpendicular to the plane determined by the axes of said cores, a generally triangular permeable armature pivotally mounted on said pivot axis on said portions of said frame between and generally parallel to said frame plates, said armature conforming generally to the triangular disposition of said magnet and said cores and being balanced to opposite sides of said pivot axis, the one of said frame portions adjacent said electromagnetic assemblies being movable relative to said assemblies and the inner frame plate, an adjusting screw carried by said inner frame plate and engaging said last-named frame portion for moving said portion to adjust the air gap between said cores and said armature, said armature including an actuating bar extending equal distances to opposite sides thereof transversely of its pivot axis adjacent said permanent magnet, a contact assembly mounted intermediate said frame plates adjacent said bar, said assembly including an elongate contact carrying spring mounted intermediate its ends on the outer frame plate parallel to said bar, said spring including a pair of oppositely extending arms resiliently engaging the opposite ends of said bar and normally biasing said armature to a balanced position midway between its ends positions, adjusting screws carried by said outer frame plate for adjusting the spring force of each of said arms, a pair of stationary contact springs carried by said outer frame plate in alignment respectively with the ends of said arms, adjusting screws carried by said outer frame plate for adjusting the position of each of said stationary contact springs, adjusting screws carried by said inner frame plate adjacent the ends of said arms for limiting movement of said arms away from said stationary contact springs, said adjusting screws and the contacts carried by said springs being disposed to opposite sides of said armature adjacent the apex thereof, and a permeable shunt adjustably mounted on said permanent magnet to vary the magnetic flux thereof, said shunt and said adjusting screws facilitating calibration of the relay.

References Cited in the file of this patent

UNITED STATES PATENTS

| 1,790,671 | Lazich | Feb. 3, 1931 |
| 2,404,227 | Hall | July 16, 1946 |
| 2,428,218 | Herbst | Sept. 30, 1947 |
| 2,594,088 | Sonnemann et al. | Apr. 22, 1952 |
| 2,702,841 | Bernstein | Feb. 22, 1955 |